United States Patent
Clare

(10) Patent No.: US 11,685,144 B2
(45) Date of Patent: Jun. 27, 2023

(54) MULTILAYER FILMS AND SEALED PACKAGES MADE FROM THESE FILMS

(71) Applicant: NOVA Chemicals (International) S.A., Fribourg (CH)

(72) Inventor: Robert Clare, Cochrane (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 17/949,119

(22) Filed: Sep. 20, 2022

(65) Prior Publication Data

US 2023/0022099 A1 Jan. 26, 2023

Related U.S. Application Data

(62) Division of application No. 17/407,078, filed on Aug. 19, 2021, now Pat. No. 11,485,122, which is a division of application No. 16/976,816, filed as application No. PCT/IB2019/051241 on Feb. 15, 2019, now Pat. No. 11,148,406.

(60) Provisional application No. 62/640,330, filed on Mar. 8, 2018.

(51) Int. Cl.
| | |
|---|---|
| B29C 65/18 | (2006.01) |
| B32B 27/32 | (2006.01) |
| B32B 7/08 | (2019.01) |
| B32B 27/08 | (2006.01) |
| B29C 65/00 | (2006.01) |
| C08F 2/01 | (2006.01) |

(52) U.S. Cl.
CPC ............ B32B 27/327 (2013.01); B29C 65/18 (2013.01); B29C 66/1122 (2013.01); B29C 66/71 (2013.01); B29C 66/723 (2013.01); B29C 66/7313 (2013.01); B29C 66/73921 (2013.01); B32B 7/08 (2013.01); B32B 27/08 (2013.01); B32B 2250/05 (2013.01); B32B 2250/246 (2013.01); B32B 2307/72 (2013.01); B32B 2439/40 (2013.01); B32B 2439/70 (2013.01); C08F 2/01 (2013.01)

(58) Field of Classification Search
CPC ..... B29C 65/18; B29C 66/1122; B29C 66/71; B29C 66/723; B29C 66/73921; B29C 66/7313
USPC ....................................................... 428/218
See application file for complete search history.

(56) References Cited

U.S. PATENT DOCUMENTS

| | | | |
|---|---|---|---|
| 5,206,075 A | 4/1993 | Hodgson, Jr. | |
| 6,722,106 B2 | 4/2004 | Bartel et al. | |
| 9,296,171 B2 | 3/2016 | Bierschenk et al. | |
| 9,512,282 B2 | 12/2016 | Li et al. | |
| 11,148,406 B2 * | 10/2021 | Clare | B29C 66/71 |
| 11,485,122 B2 * | 11/2022 | Clare | B29C 66/71 |

FOREIGN PATENT DOCUMENTS

CA 2977513 A1 3/2018

OTHER PUBLICATIONS

ASTM D1003-07; Standard Test Method for Haze and Luminous Transmittance of Transparent Plastics; Current Edition approved Nov. 1, 2007. Published Nov. 2007. Originally approved in 1949. Last previous edition approved in 2000 as D1003-00. pp. 1-8.
ASTM D1238-13; Standard Test Method for Mell Flow Rates of Thermoplastics by Extrusion Plastometer; Current edition approved Aug. 1, 2013. Published Aug. 2013. Originally approved in 1965. Last previous edition approved in 2010 as D1238-10. pp. 1-16.
ASTM D2457-13; Standard Test Method for Specular Gloss of Plastic Films and Solid Plastics; Current edition Approved Apr. 1, 2013. Published Apr. 2013. Originally approved in 1965. Last previous edition approved in 2008 as D2457-08. pp. 1-6.
ASTM D2923-13; Standard Test Method for Rigidity of Polyolefin Film and Sheeting; Current edition approved Sep. 1, 2013. Published Sep. 2013. Originally approved in 1970. Last previous edition approved in 2008 as D2923-08. pp. 1-5.
ASTM D3124-98; Standard Test Method for Vinylidene Unsaturation in Polyethylene by infrared Spectrophotometry; Current Edition approved Feb. 1, 2011. Published Mar. 2011. Originally approved in 1972. Last previous edition approved in 2003 as D3124-98(2003). pp. 1-4.
ASTM D6248-98; Standard Test Method for Vinyl and Trans Unsaturation in Polyethylene by Infrared Spectrophotometry; Current edition approved May 1, 2012. Published Jul. 2012. Originally approved in 1998. Last previous edition approved in 20014 as D6248-98 (2004). pp. 1-3.
ASTM D638-14 Standard Test Method for Tensile Properties of Plastics, ASTM International, Mar. 2015 (17 pages).

(Continued)

*Primary Examiner* — James D Sells
(74) *Attorney, Agent, or Firm* — Thomas J. Styslinger

(57) ABSTRACT

Multilayer Films have a first skin layer that is prepared from a high density polyethylene and a second skin layer (also referred to as the sealant layer) that is prepared from a linear low density polyethylene (LLDPE) having a density of from 0.90 to 0.92 g/cc and a Dilution Index, Yd, of greater than 0°. Seals can be prepared by placing two pieces of this film against each other such that the sealant layers are in contact with each other, then applying heat to at least one high density skin layer such that heat is transmitted/conducted through the multilayer film in a sufficient amount to melt the sealant layer and form a seal. The use of LLDPE having a Dilution Index of greater than 0° has been found to improve the sealing performance of multilayer films in comparison to multilayer films where the sealant layer is a conventional LLDPE having a Dilution Index of less than 0°.

17 Claims, No Drawings

(56) References Cited

OTHER PUBLICATIONS

ASTM D6474-12; Standard Test Method for Determining Molecular Weight Distribution and Molecular Weight Averages of Polyolefins by High Temperature Gel Permeation Chromatography; Current edition approved Dec. 15, J012. Published Dec. 2012. Originally approved in 1999. Last previous edition approved in 2006 as D6474-99 2006). pp. 1-6.

ASTM D6645-01 Standard Test Method for Methyl (Comonomer) Content in Polyethylene by Infrared Spectrophotometry, ASTM International, Jan. 2010 (4 pages).

ASTM D790-15 Standard Test Methods for Flexural Properties of Unreinforced and Reinforced Plastics and Electrical Insulating Materials, ASTM International, Jan. 2016 (12 pages).

ASTM D792-13; Standard Test Methods for Density and Specific Gravity (Relative Density) of Plastics by Displacement; Current edition approved Nov. 1, 2013. Published Nov. 2013. Originally approved in 1944. Last previous edition approved in 2008 as D792-08. pp. 1-6.

Dealy, John and Plazek, Don; Time-Temperature Superposition—A Users Guide; Jul. 2009; Rheology Bulletin, 78(2); pp. 16-31.

International Search Report and Written corresponding to PCT/IB2019/051241, dated May 15, 2019, 11 pages.

Nobile, Maria Rossella; Evaluation of molecular weight distribution from dynamic moduli; Rheol. Acta. (2001); vol. 10, pp. 111-119.

Non-Final Office Action on U.S. Appl. No. 16/976,816 dated Feb. 10, 2021.

Notice of Allowance on U.S. Appl. No. 16/976,816 dated Jun. 16, 2021.

Notice of Allowance on U.S. Appl. No. 17/407,078 dated Aug. 31, 2022.

Twinkle, Stefan; Walter, Philipp and Friedrich, Christian; Van Gurp-Palmen Plot II—classification of long chain branched polymers by their topology; Rheol. Acto (2002); 41; pp. 103-113.

Van Gurp, Marnix and Palmen, Jo; Time-Temperature Superposition for Polymeric Blends; 1998; Rheol. Bulletin; 67(1 ); pp. 5-8.

Wild, L.; Ryle, T.R.; Knobeloch, D.C. and Peat, I.R.; Determination of Branching Distributions in Polyethylene and Ethylene Copolymers; Copyright 1982 John Wiley & Sons; Journal of Polymer Science; Polymer Physics Edition, vol. 20, pp. 441-455.

Wu, Souheng; Chain Structure and Entanglement; Copyright 1989 John Wiley & Sons; Journal of Polymer Science: Part B: Polymer Physics, vol. 27, pp. 723-741.

* cited by examiner

MULTILAYER FILMS AND SEALED PACKAGES MADE FROM THESE FILMS

CROSS-REFERENCE TO RELATED PATENT APPLICATIONS

This application is a Division of U.S. patent application Ser. No. 17/407,078, filed Aug. 19, 2021, which is a Division of U.S. patent application Ser. No. 16/976,816, filed Aug. 31, 2020, now U.S. Pat. No. 11,148,406, which is a National Phase entry of PCT/IB2019/051241, filed Feb. 15, 2019, which claims the benefit of priority to U.S. Provisional Patent Application No. 62/640,330, filed Mar. 8, 2018, all of which are incorporated herein by reference in their entirety.

TECHNICAL FIELD

Provided herein are multilayer, recyclable polyethylene films with improved sealing performance and packages made from these films.

BACKGROUND ART

Simple, inexpensive and recyclable polyethylene packages may be easily prepared by heat sealing together two layers of polyethylene to form a product known as a "pillow pack" to those skilled in the art. Pillow packages do not provide the stiffness/rigidity which is desirable for higher quality packages, such as Stand Up Pouch (SUP) packages; some Form-Full-Seal (FFS) packages or embossed packages. These higher quality/more rigid packages are typically made with a layer of a stiffer polymer (such as polyester or polyamide) and this makes these multilayer/multicomponent films difficult to recycle because it is not possible to easily separate the polyethylene layer from the polyester (or polyamide) layer in current recycling facilities.

More recently, "all polyethylene" film structures for use in the manufacture of stand up pouches have become available. These films need to be carefully designed to give the right performance as a finished package, and to be "processable" on the equipment that converts the films to packages at high production rates.

Forming seals in these pouches poses a challenge because the heat energy needed to form a hermetic seal can be too high for the film structure to survive. The films should offer a low SIT (seal initiation temperature) and good "caulkability" (i.e. the ability to form seals through contamination and to allow the sealant to flow to prevent pinhole leaks).

One problem when preparing sealed packages on a Form/Fill/Seal (FFS) packaging machine is to produce a good hermetic seal at the base of the pouch.

Some known films address this problem by using a layer of polyester (PET) and a layer of polyethylene (PE). The PET layer does not soften as much as the PE during the sealing process because it has a melting temperature higher than 200° C., but the polyethylene does melt and flow to form the seal. However, as noted above, these films (and packages made from them) are difficult to recycle.

Polyethylene melts at much lower temperatures, which limits the maximum sealing bar temperature to around 150° C. Above that, the film material is likely to "burn through".

It is known to prepare "all PE" multilayer films having a high density skin layer (which melts at a temperature of from 130 to 135° C.) and a sealant layer made from a single site catalyzed, linear low density polyethylene (SSC-LLDPE) having a lower melting point. The sealing bar is applied to the high density skin layer and heat is conducted through the film structure to the sealant layer (the second skin) to form the seal.

SUMMARY OF INVENTION

Disclosed herein are improved films—which allow for the preparation of high quality seals at high production rates—that can be prepared by using a linear low density polyethylene having a dilution index, Yd, of greater than 0°. These polyethylenes may be prepared using a dual catalyst system as described in U.S. Pat. No. 9,512,282 (Li et al. to NOVA Chemicals Corporation).

In an embodiment, provided herein is a multilayer film comprising:

a) a first skin layer consisting of from 85 to 100 weight % of a high density polyethylene having a density of from 0.95 to 0.97 g/cc and a melt index, $I_2$, of from 0.5 to 10 g/10 minutes;

b) a second skin layer consisting of from 85 to 100 weight % of a first linear low density interpolymer having a molecular weight distribution Mw/Mn of from 2.5 to 4.0, a density of from 0.90 to 0.92 g/cc, a melt index, $I_2$, of from 0.3 to 3 g/10 minutes and a Dilution Index, Yd, of greater than 0°; and c) a core comprising polyethylene, with the proviso that the polymeric material used to prepare said multilayer film is at least 90% by weight polyethylene based on the total weight of said polymeric material.

In another embodiment, provided herein is a multilayer film comprising:

a) a first skin layer consisting of from 85 to 100 weight % of a high density polyethylene having a density of from 0.95 to 0.97 g/cc and a melt index, $I_2$, of from 0.5 to 10 g/10 minutes;

b) a second skin layer consisting of from 85 to 100 weight % of a first linear low density interpolymer having a molecular weight distribution Mw/Mn of from 2.5 to 4.0, a density of from 0.90 to 0.92 g/cc, a melt index, $I_2$, of from 0.3 to 3 g/10 minutes and a Dilution Index, Yd, of greater than 0°; and c) a core comprising at least one layer of linear low density polyethylene, having a density of from 0.90 to 0.92 g/cc;
with the proviso that the polymeric material used to prepare said multilayer film is at least 90% by weight polyethylene based on the total weight of said polymeric material.

In another embodiment, provided herein is a multilayer film comprising:

a) a first skin layer consisting of from 85 to 100 weight % of a high density polyethylene having a density of from 0.95 to 0.97 g/cc and a melt index, $I_2$, of from 0.5 to 10 g/10 minutes;

b) a second skin layer consisting of from 85 to 100 weight % of a first linear low density interpolymer having a molecular weight distribution Mw/Mn of from 2.5 to 4.0, a density of from 0.90 to 0.92 g/cc, a melt index, $I_2$, of from 0.3 to 3 g/10 minutes and a Dilution Index, Yd, of greater than 0°; and c) a core comprising at least one layer of medium density polyethylene having a density of from 0.930 to 0.945 g/cc, with the proviso that the polymeric material used to prepare said multilayer film is at least 90% by weight polyethylene based on the total weight of said polymeric material.

In another embodiment, provided herein is a process to make a sealed package with a multilayer film comprising:

a) a first skin layer consisting of from 85 to 100 weight % of a high density polyethylene having a density of from 0.95 to 0.97 g/cc and a melt index, $I_2$, of from 0.5 to 10 g/10 minutes;

b) a second skin layer consisting of from 85 to 100 weight % of a first linear low density interpolymer having a molecular weight distribution Mw/Mn of from 2.5 to 4.0, a density of from 0.90 to 0.92 g/cc, a melt index, $I_2$, of from 0.3 to 3 g/10 minutes and a Dilution Index, Yd, of greater than 0°; and c) a core comprising polyethylene, with the proviso that the polymeric material used to prepare said multilayer film is at least 90% by weight polyethylene based on the total weight of said polymeric material;

said process comprising forming a package structure by placing a first layer of said multilayer film on top of a second layer of said multilayer film such that the second skin layer of said first layer is in contact with said second skin layer; applying heat and pressure to at least one of said first skin layer of said first layer and said second skin layer of said second layer wherein said heat and pressure is sufficient to melt bond said second skin layer of said first layer to said second skin layer of said second layer.

In another embodiment, provided herein is a multilayer film comprising:

a) a first skin layer consisting of from 85 to 100 weight % of a high density polyethylene having a density of from 0.95 to 0.97 g/cc and a melt index, $I_2$, of from 0.5 to 10 g/10 minutes;

b) a second skin layer consisting of from 85 to 100 weight % of a first linear low density interpolymer having a molecular weight distribution Mw/Mn of from 2.5 to 4.0, a density of from 0.90 to 0.92 g/cc, a melt index, $I_2$, of from 0.3 to 3 g/10 minutes and a Dilution Index, Yd, of greater than 0°; and c) a core comprising medium density polyethylene having a density of from 0.930 to 0.945 g/cc, with the proviso that the polymeric material used to prepare said multilayer film is at least 90% by weight polyethylene based on the total weight of said polymeric material. In another embodiment, provided herein is a stand up pouch made according to this process.

The films of this invention contain at least 90 weight % (especially at least 95 weight %) of polyethylene, based on the total weight of polymeric material in the film, to allow for recycling.

The first skin layer in all films consists of from 85 to 100 weight % of specified high density polyethylene, based on the weight of polymeric material in the skin layer. In general, this skin layer may be 100 weight % of the specified high density polyethylene although minor amounts (up to 15 weight %) of other polymers (especially other polyethylene polymers) may be included.

The second skin layer in all films consists of from 85 to 100 weight % of specified LLDPE (having a dilution index, Yd, of greater than 0°) based on the weight of polymeric material in the second skin layer. In general, this skin layer may be 100% of the specified LLDPE although minor amounts (up to 15 weight %) of other polymers (especially other polyethylene polymers) may be included.

DESCRIPTION OF EMBODIMENTS

Definition of Terms

Other than in the examples or where otherwise indicated, all numbers or expressions referring to quantities of ingredients, extrusion conditions, etc. used in the specification and claims are to be understood as modified in all instances by the term "about". Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

In order to form a more complete understanding of this disclosure the following terms are defined and should be used with the accompanying figures and the description of the various embodiments throughout.

The term "Dilution Index $(Y_d)$" and "Dimensionless Modulus $(X_d)$" are based on rheological measurements and are fully described in this disclosure.

As used herein, the term "monomer" refers to a small molecule that may chemically react and become chemically bonded with itself or other monomers to form a polymer.

As used herein, the term "α-olefin" is used to describe a monomer having a linear hydrocarbon chain containing from 3 to 20 carbon atoms having a double bond at one end of the chain.

As used herein, the terms "ethylene polymer" (and "polyethylene"), refers to macromolecules produced from ethylene monomers and optionally one or more additional monomers; regardless of the specific catalyst or specific process used to make the ethylene polymer. In the polyethylene art, the one or more additional monomers are called "comonomer(s)" and often include α-olefins. The term "homopolymer" refers to a polymer that contains only one type of monomer. Common ethylene polymers include high density polyethylene (HDPE), medium density polyethylene (MDPE), linear low density polyethylene (LLDPE), very low density polyethylene (VLDPE), ultralow density polyethylene (ULDPE), plastomer and elastomers. The term ethylene polymer also includes polymers produced in a high pressure polymerization processes; non-limiting examples include low density polyethylene (LDPE), ethylene vinyl acetate copolymers (EVA), ethylene alkyl acrylate copolymers, ethylene acrylic acid copolymers and metal salts of ethylene acrylic acid (commonly referred to as ionomers).

The term ethylene polymer also includes block copolymers which may include 2 to 4 comonomers. The term ethylene polymer also includes combinations of, or blends of, the ethylene polymers described above.

The term "linear" ethylene polymer refers to a polymer that is prepared with a transition metal catalyst—such polymers typically have a structure that is predominantly linear whereas ethylene polymers prepared in a high pressure process typically have a large amount of long chain branching.

The term "heterogeneous ethylene polymer" refers to polymers that are produced using a heterogeneous catalyst formulation; non-limiting examples of which include Ziegler-Natta or chromium catalysts.

The term "homogeneous ethylene polymer" refers to polymers that are produced using metallocene or single-site catalysts. Typically, homogeneous ethylene polymers have narrow molecular weight distributions, for example gel permeation chromatography (GPC) $M_w/M_n$ values of less than 2.8; $M_w$ and $M_n$ refer to weight and number average molecular weights, respectively. In contrast, the $M_w/M_n$ of heterogeneous ethylene polymers are typically greater than the $M_w/M_n$ of homogeneous ethylene polymers. In general, homogeneous ethylene polymers also have a narrow comonomer distribution, i.e. each macromolecule within the molecular weight distribution has a similar comonomer content. Frequently, the composition distribution breadth index "CDBI" is used to quantify how the comonomer is distributed within an ethylene polymer, as well as to differentiate ethylene polymers produced with different catalysts or processes. The "$CDBI_{50}$" is defined as the percent of ethylene polymer whose composition is within 50% of the median comonomer composition; this definition is consistent with that described in U.S. Pat. No. 5,206,075 assigned to Exxon Chemical Patents Inc. The $CDBI_{50}$ of an ethylene polymer can be calculated from TREF curves (Temperature Rising Elution Fractionation); the TREF method is described in Wild et al., J. Polym. Sci., Part B, Polym. Phys., Vol. 20 (3), pages 441-455. Typically the $CDBI_{50}$ of homogeneous ethylene polymers are greater than about 70%. In contrast, the $CDBI_{50}$ of (α-olefin containing heterogeneous ethylene polymers are generally lower than the $CDBI_{50}$ of homogeneous ethylene polymers.

It is well known to those skilled in the art, that homogeneous ethylene polymers are frequently further subdivided into "linear homogeneous ethylene polymers" and "substantially linear homogeneous ethylene polymers". These two subgroups differ in the amount of long chain branching; more specifically, linear homogeneous ethylene polymers have less than about 0.01 long chain branches per 1000 carbon atoms; while substantially linear ethylene polymers have greater than about 0.01 to about 3.0 long chain branches per 1,000 carbon atoms. A long chain branch is macromolecular in nature, i.e. similar in length to the macromolecule that the long chain branch is attached to. Hereafter, in this disclosure, the term "homogeneous ethylene polymer" refers to both linear homogeneous ethylene polymers and substantially linear homogeneous ethylene polymers.

Herein, the term "polyolefin" includes ethylene polymers and propylene polymers; non-limiting examples of propylene polymers include isotactic, syndiotactic and atactic propylene homopolymers, random propylene copolymers containing at least one comonomer and impact polypropylene copolymers or heterophasic polypropylene copolymers.

The term "thermoplastic" refers to a polymer that becomes liquid when heated, will flow under pressure and solidify when cooled. Thermoplastic polymers include ethylene polymers as well as other polymers commonly used in the plastic industry; non-limiting examples of other polymers commonly used in film applications include barrier resins (EVOH), tie resins, polyethylene terephthalate (PET), polyamides and the like. The amount of EVOH may be from 0.5 to 5 weight % (when used) because a maximum use of 5% allows the film to be recycled in many facilities.

As used herein the term "monolayer film" refers to a film containing a single layer of one or more thermoplastics and multilayer film refers to a film containing more than one layer.

The films of this invention are multilayer films—i.e. they contain more than one layer. More specifically, the multilayer films of this invention have at least three layers—namely two exterior surface layers (which are commonly referred to by those skilled in the art as "skin" layers) and at least one layer between the skin layers—commonly referred to as a "core" layer or layers (with the entire composition between the skin layers also being referred to as the "core"). For clarity: a nine layer film would have two exterior surface layers (skin layers) and seven core layers. It is also within the scope of this invention to prepare a multilayer core in which the core layers are made with the same or different types of polyethylenes. If, for example, all of the core layers are prepared from the same type of polyethylene, then a person skilled in the art may sometimes refer to these layers (collectively) as a single layer—for clarity—a film made with seven core layers in which all core layers are made with the same type of polyethylene may sometimes be referred to by skilled persons as being equivalent to a three layer film.

The multilayer films of this invention may be prepared by coextrusion or lamination and both of these techniques are well known. It is also known to laminate together two multilayer films that have been prepared by coextrusion—for example, a coextruded film having three layers may be laminated to a coextruded film having five layers to prepare an eight layer film.

The multilayer films of this invention must contain one skin layer that comprises high density polyethylene and another skin layer that contains a linear low density polyethylene having a dilution index, Yd of greater than 0°—these requirements help with the fabrication of sealed packages that are made from the film. The seals may be formed by applying a heated sealing bar to the skin layer that contains the high density polyethylene. Heat from the sealing bar is conducted through the thickness of the film and causes the skin layer that is made with linear low density polyethylene (which skin layer is commonly referred to as sealant layer) to melt, thereby allowing the formation of a seal after the source of heat is removed and this layer freezes.

The term "polymeric material" refers to the polymers used to prepare the films. A film made from 95 weight % polyethylene and 5 weight % EVOH can be described as containing 95% by weight polyethylene based on the total weight of polymeric material used to make the film (i.e. 95+95+5).

As used herein, the terms "hydrocarbyl", "hydrocarbyl radical" or "hydrocarbyl group" refers to linear or cyclic, aliphatic, olefinic, acetylenic and aryl (aromatic) radicals comprising hydrogen and carbon that are deficient by one hydrogen.

As used herein, an "alkyl radical" includes linear, branched and cyclic paraffin radicals that are deficient by one hydrogen radical; non-limiting examples include methyl ($-CH_3$) and ethyl ($-CH_2CH_3$) radicals. The term "alkenyl radical" refers to linear, branched and cyclic hydrocarbons containing at least one carbon-carbon double bond that is deficient by one hydrogen radical.

As used herein, the term "aryl" group includes phenyl, naphthyl, pyridyl and other radicals whose molecules have an aromatic ring structure; non-limiting examples include naphthylene, phenanthrene and anthracene. An "arylalkyl" group is an alkyl group having an aryl group pendant there from; non-limiting examples include benzyl, phenethyl and tolylmethyl; an "alkylaryl" is an aryl group having one or more alkyl groups pendant there from; non-limiting examples include tolyl, xylyl, mesityl and cumyl.

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms selected from the group consisting of boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, thioethers, and the like. The term "heterocyclic" refers to ring systems having a carbon backbone that comprise from 1 to 3 atoms selected from the group consisting of boron, aluminum, silicon, germanium, nitrogen, phosphorous, oxygen and sulfur.

As used herein the term "unsubstituted" means that hydrogen radicals are bounded to the molecular group that follows the term unsubstituted. The term "substituted" means that the group following this term possesses one or more moieties that have replaced one or more hydrogen radicals in any position within the group; non-limiting examples of moieties include halogen radicals (F, Cl, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Non-limiting examples of substituted alkyls and aryls include: acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals and combinations thereof.

Herein the term "R1" and its superscript form $^{"R1"}$ refers to a first reactor in a continuous solution polymerization process; it being understood that R1 is distinctly different from the symbol $R^1$; the latter is used in chemical formula, e.g. representing a hydrocarbyl group. Similarly, the term "R2" and it's superscript form $^{"R2"}$ refers to a second reactor, and; the term "R3" and it's superscript form $^{"R3"}$ refers to a third reactor.

As used herein, the term "oligomers" refers to an ethylene polymer of low molecular weight, e.g., an ethylene polymer with a weight average molecular weight ($M_w$) of about 2,000 to 3,000 daltons. Other commonly used terms for oligomers include "wax" or "grease".

Disclosed herein are ethylene polymers having a density of from 0.90 to 0.92 and a Dilution Index, yd, of greater than 0. Such polymers may be prepared using known methods, for example the method using a single site catalyst and a heterogeneous catalyst as disclosed in U.S. Pat. No. 9,512, 282.

Single Site Catalyst Formulation

The catalyst components which make up the single site catalyst formulation are not particularly limited, i.e. a wide variety of catalyst components can be used. One non-limiting embodiment of a single site catalyst formulation comprises the following three or four components: a bulky ligand-metal complex; an alumoxane co-catalyst; an ionic activator and optionally a hindered phenol. In Tables 1A, 2A, 3A and 4A of this disclosure: "(i)" refers to the amount of "component (i)", i.e. the bulky ligand-metal complex added to R1; "(ii)" refers to "component (ii)", i.e. the alumoxane co-catalyst; "(iii)" refers to "component (iii)" i.e. the ionic activator, and; "(iv)" refers to "component (iv)", i.e. the optional hindered phenol.

Non-limiting examples of component (i) are represented by formula (I):

$(L^A)_a M(Pl)_b (Q)_n$          (I)

wherein ($L^A$) represents a bulky ligand; M represents a metal atom; Pl represents a phosphinimine ligand; Q represents a leaving group; a is 0 or 1; b is 1 or 2; (a+b)=2; n is 1 or 2, and; the sum of (a+b+n) equals the valance of the metal M.

Non-limiting examples of the bulky ligand $L^A$ in formula (I) include unsubstituted or substituted cyclopentadienyl ligands or cyclopentadienyl-type ligands, heteroatom substituted and/or heteroatom containing cyclopentadienyl-type ligands. Additional non-limiting examples include, cyclopentaphenanthreneyl ligands, unsubstituted or substituted indenyl ligands, benzindenyl ligands, unsubstituted or substituted fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine, pyrrolyl ligands, pyrozolyl ligands, carbazolyl ligands, borabenzene ligands and the like, including hydrogenated versions thereof, for example tetrahydroindenyl ligands. In other embodiments, $L^A$ may be any other ligand structure capable of η-bonding to the metal M, such embodiments include both $\eta^3$-bonding and $\eta^5$-bonding to the metal M. In other embodiments, $L^A$ may comprise one or more heteroatoms, for example, nitrogen, silicon, boron, germanium, sulfur and phosphorous, in combination with carbon atoms to form an open, acyclic, or a fused ring, or ring system, for example, a heterocyclopentadienyl ancillary ligand. Other non-limiting embodiments for $L^A$ include bulky amides, phosphides, alkoxides, aryloxides, imides, carbolides, borollides, porphyrins, phthalocyanines, corrins and other polyazomacrocycles.

Non-limiting examples of metal M in formula (I) include Group 4 metals, titanium, zirconium and hafnium.

The phosphinimine ligand, Pl, is defined by formula (II):

$(R^P)_3 P = N -$          (II)

wherein the $R^P$ groups are independently selected from: a hydrogen atom; a halogen atom; $C_{1-20}$ hydrocarbyl radicals which are unsubstituted or substituted with one or more halogen atom(s); a $C_{1-8}$ alkoxy radical; a $C_{6-10}$ aryl radical; a $C_{6-10}$ aryloxy radical; an amido radical; a silyl radical of formula $-Si(R^5)_3$, wherein the $R^S$ groups are independently selected from, a hydrogen atom, a $C_{1-8}$ alkyl or alkoxy radical, a $C_{6-10}$ aryl radical, a $C_{6-10}$ aryloxy radical, or a germanyl radical of formula $-Ge(R^G)_3$, wherein the $R^G$ groups are defined as $R^S$ is defined in this paragraph.

The leaving group Q is any ligand that can be abstracted from formula (I) forming a catalyst species capable of polymerizing one or more olefin(s). An equivalent term for Q is an "activatable ligand", i.e. equivalent to the term "leaving group". In some embodiments, Q is a monoanionic labile ligand having a sigma bond to M. Depending on the oxidation state of the metal, the value for n is 1 or 2 such that formula (I) represents a neutral bulky ligand-metal complex.

Non-limiting examples of Q ligands include a hydrogen atom, halogens, $C_{1-20}$ hydrocarbyl radicals, $C_{1-20}$ alkoxy radicals, $C_{5-10}$ aryl oxide radicals; these radicals may be linear, branched or cyclic or further substituted by halogen atoms, $C_{1-10}$ alkyl radicals, $C_{1-10}$ alkoxy radicals, $C_{6-10}$ arly or aryloxy radicals. Further non-limiting examples of Q ligands include weak bases such as amines, phosphines, ethers, carboxylates, dienes, hydrocarbyl radicals having from 1 to 20 carbon atoms. In another embodiment, two Q ligands may form part of a fused ring or ring system.

Further embodiments of component (i) of the single site catalyst formulation include structural, optical or enantiomeric isomers (meso and racemic isomers) and mixtures thereof of the bulky ligand-metal complexes described in formula (I) above.

The second single site catalyst component, component (ii), is an alumoxane co-catalyst that activates component (i) to a cationic complex. An equivalent term for "alumoxane" is "aluminoxane"; although the exact structure of this co-catalyst is uncertain, subject matter experts generally agree that it is an oligomeric species that contain repeating units of the general formula (III):

$$(R)_2AlO\text{—}(Al(R)\text{—}O)_n\text{—}Al(R)_2 \quad \text{(III)}$$

where the R groups may be the same or different linear, branched or cyclic hydrocarbyl radicals containing 1 to 20 carbon atoms and n is from 0 to about 50. A non-limiting example of an alumoxane is methyl aluminoxane (or MAO) wherein each R group in formula (III) is a methyl radical.

The third catalyst component (iii) of the single site catalyst formation is an ionic activator. In general, ionic activators are comprised of a cation and a bulky anion; wherein the latter is substantially non-coordinating. Non-limiting examples of ionic activators are boron ionic activators that are four coordinate with four ligands bonded to the boron atom. Non-limiting examples of boron ionic activators include the following formulas (IV) and (V) shown below:

$$[R^5]^+[B(R^7)_4]^- \quad \text{(IV)}$$

where B represents a boron atom, $R^5$ is an aromatic hydrocarbyl (e.g. triphenyl methyl cation) and each $R^7$ is independently selected from phenyl radicals which are unsubstituted or substituted with from 3 to 5 substituents selected from fluorine atoms, $C_{1-4}$ alkyl or alkoxy radicals which are unsubstituted or substituted by fluorine atoms; and a silyl radical of formula $\text{—Si}(R^9)_3$, where each $R^9$ is independently selected from hydrogen atoms and $C_{1-4}$ alkyl radicals, and; compounds of formula (V):

$$[(R^8)_tZH]^+[B(R^7)_4]^- \quad \text{(V)}$$

where B is a boron atom, H is a hydrogen atom, Z is a nitrogen or phosphorus atom, t is 2 or 3 and $R^8$ is selected from $C_{1-8}$ alkyl radicals, phenyl radicals which are unsubstituted or substituted by up to three $C_{1-4}$ alkyl radicals, or one $R^8$ taken together with the nitrogen atom may form an anilinium radical and $R^7$ is as defined above in formula (IV).

In both formula (IV) and (V), a non-limiting example of $R^7$ is a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators include: triethylammonium tetra(phenyl) boron, tripropylammonium tetra(phenyl)boron, tri(n-butyl) ammonium tetra(phenyl)boron, trimethylammonium tetra (p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium tetrakis(2,3,5,6-tetrafluorophenyl)borate, triphenylmethylium tetrakis(2,3,5,6-tetrafluorophenyl)borate, benzene(diazonium) tetrakis(3,4,5-trifluorophenyl)borate, tropillium tetrakis(3,4,5-trifluorophenyl)borate, benzene(diazonium) tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropillium tetrakis(2,3,4,5-tetrafluorophenyl)borate, triphenylmethylium tetrakis(2,3,4,5-tetrafluorophenyl)borate, and benzene(diazonium) tetrakis (2,3,4,5 tetrafluorophenyl)borate. Readily available commercial ionic activators include N,N-dimethylanilinium tetrakispentafluorophenyl borate, and triphenylmethylium tetrakispentafluorophenyl borate.

The optional fourth catalyst component of the single site catalyst formation is a hindered phenol, component (iv). Non-limiting example of hindered phenols include butylated phenolic antioxidants, butylated hydroxytoluene, 2,4-di-tertiarybutyl-6-ethyl phenol, 4,4'-methylenebis (2,6-di-tertiarybutylphenol), 1,3,5-trimethyl-2,4,6-tris (3,5-di-tert-butyl-4-hydroxybenzyl) benzene and octadecyl-3-(3',5'-di-tert-butyl-4'-hydroxyphenyl) propionate.

To produce an active single site catalyst formulation the quantity and mole ratios of the three or four components, (i) through (iv) are optimized as described below.

Heterogeneous Catalyst Formulations

A number of heterogeneous catalyst formulations are well known to those skilled in the art, including, as non-limiting examples, Ziegler-Natta and chromium catalyst formulations.

In this disclosure, embodiments include an in-line Ziegler-Natta catalyst formulation and a batch Ziegler-Natta catalyst formation. The term "in-line Ziegler-Natta catalyst formulation" refers to the continuous synthesis of a small quantity of active Ziegler-Natta catalyst and immediately injecting this catalyst into at least one continuously operating reactor, wherein the catalyst polymerizes ethylene and one or more optional α-olefins to form an ethylene polymer. The terms "batch Ziegler-Natta catalyst formulation" or "batch Ziegler-Natta procatalyst" refer to the synthesis of a much larger quantity of catalyst or procatalyst in one or more mixing vessels that are external to, or isolated from, the continuously operating solution polymerization process. Once prepared, the batch Ziegler-Natta catalyst formulation, or batch Ziegler-Natta procatalyst, is transferred to a catalyst storage tank. The term "procatalyst" refers to an inactive catalyst formulation (inactive with respect to ethylene polymerization); the procatalyst is converted into an active catalyst by adding an alkyl aluminum co-catalyst. As needed, the procatalyst is pumped from the storage tank to at least one continuously operating reactor, where an active catalyst is formed and polymerizes ethylene and one or more optional α-olefins to form an ethylene polymer. The pro-catalyst may be converted into an active catalyst in the reactor or external to the reactor.

A wide variety of chemical compounds can be used to synthesize an active Ziegler-Natta catalyst formulation. The following describes various chemical compounds that may be combined to produce an active Ziegler-Natta catalyst formulation. Those skilled in the art will understand that the embodiments in this disclosure are not limited to the specific chemical compound disclosed.

An active Ziegler-Natta catalyst formulation may be formed from: a magnesium compound, a chloride compound, a metal compound, an alkyl aluminum co-catalyst and an aluminum alkyl. In Table 1A, 2A, 3A and 4A of this disclosure: "(v)" refers to "component (v)" the magnesium compound; the term "(vi)" refers to the "component (vi)" the chloride compound; "(vii)" refers to "component (vii)" the metal compound; "(viii)" refers to "component (viii)" alkyl aluminum co-catalyst, and; "(ix)" refers to "component (ix)" the aluminum alkyl. As will be appreciated by those skilled in the art, Ziegler-Natta catalyst formulations may contain additional components; a non-limiting example of an additional component is an electron donor, e.g. amines or ethers.

A non-limiting example of an active in-line Ziegler-Natta catalyst formulation can be prepared as follows. In the first step, a solution of a magnesium compound (component (v)) is reacted with a solution of the chloride compound (component (vi)) to form a magnesium chloride support suspended in solution. Non-limiting examples of magnesium compounds include $Mg(R^1)_2$; wherein the $R^1$ groups may be the same or different, linear, branched or cyclic hydrocarbyl radicals containing 1 to 10 carbon atoms. Non-limiting examples of chloride compounds include $R^2Cl$; wherein $R^2$ represents a hydrogen atom, or a linear, branched or cyclic hydrocarbyl radical containing 1 to 10 carbon atoms. In the first step, the solution of magnesium compound may also contain an aluminum alkyl (component (ix)). Non-limiting examples of aluminum alkyl include $Al(R^3)_3$, wherein the $R^3$ groups may be the same or different, linear, branched or cyclic hydrocarbyl radicals containing from 1 to 10 carbon atoms. In the second step a solution of the metal compound (component (vii)) is added to the solution of magnesium chloride and the metal compound is supported on the magnesium chloride. Non-limiting examples of suitable metal compounds include $M(X)_n$ or $MO(X)_n$; where M represents a metal selected from Group 4 through Group 8 of the Periodic Table, or mixtures of metals selected from Group 4 through Group 8; O represents oxygen, and; X represents chloride or bromide; n is an integer from 3 to 6 that satisfies the oxidation state of the metal. Additional non-limiting examples of suitable metal compounds include Group 4 to Group 8 metal alkyls, metal alkoxides (which may be prepared by reacting a metal alkyl with an alcohol) and mixed-ligand metal compounds that contain a mixture of halide, alkyl and alkoxide ligands. In the third step a solution of an alkyl aluminum co-catalyst (component (viii)) is added to the metal compound supported on the magnesium chloride. A wide variety of alkyl aluminum co-catalysts are suitable, as expressed by formula (VI):

$$Al(R^4)_p(OR^5)_q(X)_r \quad \quad (VI)$$

wherein the $R^4$ groups may be the same or different, hydrocarbyl groups having from 1 to 10 carbon atoms; the $OR^5$ groups may be the same or different, alkoxy or aryloxy groups wherein $R^5$ is a hydrocarbyl group having from 1 to 10 carbon atoms bonded to oxygen; X is chloride or bromide, and; (p+q+r)=3, with the proviso that p is greater than 0. Non-limiting examples of commonly used alkyl aluminum co-catalysts include trimethyl aluminum, triethyl aluminum, tributyl aluminum, dimethyl aluminum methoxide, diethyl aluminum ethoxide, dibutyl aluminum butoxide, dimethyl aluminum chloride or bromide, diethyl aluminum chloride or bromide, dibutyl aluminum chloride or bromide and ethyl aluminum dichloride or dibromide.

The process described in the paragraph above, to synthesize an active in-line Ziegler-Natta catalyst formulation, can be carried out in a variety of solvents; non-limiting examples of solvents include linear or branched $C_5$ to $C_{12}$ alkanes or mixtures thereof. To produce an active in-line Ziegler-Natta catalyst formulation the quantity and mole ratios of the five components, (v) through (ix), are optimized as described below.

Additional embodiments of heterogeneous catalyst formulations include formulations where the "metal compound" is a chromium compound; non-limiting examples include silyl chromate, chromium oxide and chromocene. In some embodiments, the chromium compound is supported on a metal oxide such as silica or alumina. Heterogeneous catalyst formulations containing chromium may also include co-catalysts; non-limiting examples of co-catalysts include trialkylaluminum, alkylaluminoxane and dialkoxyalkylaluminum compounds and the like.

Ethylene polymers having a dilution index of greater than 0° may be produced using the above described two catalyst systems (single site and heterogenous) in a polymerization process, especially the solution polymerization process described in U.S. Pat. No. 9,152,282.

Dilution Index ($Y_d$) and Dimensionless Modulus (Xd)

Dilution Index ($Y_d$, having dimensions of ° (degrees)) and Dimensionless Modulus ($X_d$) may be used to describe polyethylenes. Polyethylene may be categorized by Yd and Xd as follows:

Type I: $Y_d>0$ and $X_d<0$;
Type II: $Y_d>0$ and $X_d>0$; and
Type III: $Y_d<0$ and $X_d>0$.

Further detail about these types is found in U.S. Pat. No. 9,512,282. The polyethylene used in the sealant layer of the films disclosed herein can be prepared with a dual catalyst system (a single site catalyst and a heterogenous catalyst), and has a Dilution Index, Yd of greater than 0° However, comparative (and commercially available) polyethylenes such as ELITE® 5100G and ELITE® 5400G (both ethylene/1-octene polymers available from The Dow Chemical Company (Midland, Mich., USA)) are also believed to be prepared with a similar dual catalyst system but have a Dilution Index of less than 0° and are not suitable for in the compositions described herein.

Further description of Dilution Index ($Y_d$) and Dimensionless Modulus ($X_d$) follows. In addition to having molecular weights, molecular weight distributions and branching structures, blends of ethylene polymers may exhibit a hierarchical structure in the melt phase. In other words, the ethylene polymer components may be, or may not be, homogeneous down to the molecular level depending on polymer miscibility and the physical history of the blend. Such hierarchical physical structure in the melt is expected to have a strong impact on flow and hence on processing and converting; as well as the end-use properties of manufactured articles. The nature of this hierarchical physical structure between polymers can be characterized.

The hierarchical physical structure of ethylene polymers can be characterized using melt rheology. A convenient method can be based on the small amplitude frequency sweep tests. Such rheology results are expressed as the phase angle $\delta$ as a function of complex modulus $G^*$, referred to as van Gurp-Palmen plots (as described in M. Van Gurp, J. Palmen, Rheol. Bull. (1998) 67(1): 5-8, and; Dealy J, Plazek D. Rheol. Bull. (2009) 78(2): 16-31). For a typical ethylene polymer, the phase angle $\delta$ increases toward its upper bound of 90° with $G^*$ becoming sufficiently low. A typical VGP plot is shown in Figure 4. The VGP plots are a signature of resin architecture. The rise of $\delta$ toward 90° is monotonic for an ideally linear, monodisperse polymer. The $S(G^*)$ for a branched polymer or a blend containing a branched polymer may show an inflection point that reflects the topology of the branched polymer (see S. Trinkle, P. Walter, C. Friedrich, Rheo. Acta (2002) 41: 103-113). The deviation of the phase angle $\delta$ from the monotonic rise may indicate a deviation from the ideal linear polymer either due to presence of long chain branching if the inflection point is low (e.g. $\delta \leq 20°$) or a blend containing at least two polymers having dissimilar branching structure if the inflection point is high (e.g. $\delta \geq 70°$).

For commercially available linear low density polyethylenes, inflection points are not observed; with the exception of some commercial polyethylenes that contain a small amount of long chain branching (LCB). To use the VGP plots regardless of presence of LCB, an alternative is to use the point where the frequency $\omega_c$ is two decades below the cross-over frequency $\omega_x$, i.e., $\omega_c=0.01\omega_x$. The cross-over point is taken as the reference as it is known to be a characteristic point that correlates with MI, density and other specifications of an ethylene polymer. The cross-over modulus is related to the plateau modulus for a given molecular weight distribution (see S. Wu. J Polym Sci, Polym Phys Ed (1989) 27:723; M. R. Nobile, F. Cocchini. Rheol Acta (2001) 40:111). The two decade shift in phase angle $\delta$ is to find the comparable points where the individual viscoelastic responses of constituents could be detected; to be more clear, this two decade shift is shown in Figure 5. The complex modulus $G^*_c$ for this point is normalized to the cross-over modulus, $G^*_x/(\sqrt{2})$, as $(\sqrt{2})G^*_c/G^*_x$, to minimize the variation due to overall molecular weight, molecular weight distribution and the short chain branching. As a result, the coordinates on VGP plots for this low frequency point at $\omega_c=0.01\omega_x$, namely $(\sqrt{2})G^*_c/G^*_x$ and $\delta$, characterize the contribution due to blending. Similar to the inflection points, the closer the $((\sqrt{2})G^*_c/G^*_x, \delta_c)$ point is toward the 90° upper bound, the more the blend behaves as if it were an ideal single component.

As an alternative way to avoid interference due to the molecular weight, molecular weight distribution and the short branching of the ethylene $\delta_c$ polymer ingredients, the coordinates $(G^*_c, \delta_c)$ are compared to a reference sample of interest to form the following two parameters:

"Dilution Index $(Y_d)$"

$$Y_d = \delta_c - (C_0 - C_1 e^{C_2 \ln G^*_c})$$

"Dimensionless Modulus $(X_d)$"

$$X_d = \log(G^*_c/G^*_r)$$

The constants $C_0$, $C_1$, and $C_2$ are determined by fitting the VGP data $\delta(G^*)$ of the reference sample to the following equation:

$$\delta = C_0 - C_1 e^{C_2 \ln G^*}$$

$G^*_r$ is the complex modulus of this reference sample at its $\delta_c = \delta(0.01\omega_x)$. When an ethylene polymer, synthesized with an in-line Ziegler-Natta catalyst employing one solution reactor, having a density of 0.920 g/cm³ and a melt index (MI or $I_2$) of 1.0 dg/min is taken as a reference sample, the constants are:

$C_0 = 93.43°$
$C_1 = 1.316°$
$C_2 = 0.2945$
$G^*_r = 9432$ Pa.

The values of these constants can be different if the rheology test protocol differs from that specified herein.

These regrouped coordinates $(X_d, Y_d)$ from $(G^*_c, \delta_c)$ allows comparison between ethylene polymer products disclosed herein with Comparative examples. The Dilution Index $(Y_d)$ reflects whether the blend behaves like a simple blend of linear ethylene polymers (lacking hierarchical structure in the melt) or shows a distinctive response that reflects a hierarchical physical structure within the melt. The lower the $Y_d$, the more the sample shows separate responses from the ethylene polymers that comprise the blend; the higher the $Y_d$ the more the sample behaves like a single component, or single ethylene polymer.

A solution polymerization process that uses two catalysts enables the manufacture of ethylene polymer products having higher $X_d$. Not wishing to be bound by theory, as $X_d$ increases the macromolecular coils of higher molecular weight fraction are more expanded and upon crystallization the probability of tie chain formation is increased resulting in higher toughness properties: the polyethylene art is replete with disclosures that correlate higher toughness (such as higher dart impact in film applications) with an increasing probability of tie chain formation.

In the Dilution Index testing protocol, the upper limit on $Y_d$ of the polyethylene used to prepare the sealant skin layer may be about 20, in some cases about 15 and is other cases about 13. The lower limit on $Y_d$ may be about −30, in some cases −25, in other cases −20 and in still other cases −15.

In the Dilution Index testing protocol, the upper limit on $X_d$ is 1.0, in some cases about 0.95 and in other cases about 0.9. The lower limit on $X_d$ is −2, in some cases −1.5 and in still other cases −1.0. In an embodiment, the polyethylene used in the sealant skin layer may have a Dilution Index of from 0.5 to 10, especially from 1 to 50.

Terminal Vinyl Unsaturation of Ethylene Polymer Products

Polyethylene may be further characterized by terminal vinyl unsaturation. Preferred polymers for use in the sealant skin layer of the films have such unsaturation in amounts of greater than or equal to 0.03 terminal vinyl groups per 100 carbon atoms ($\geq 0.03$ terminal vinyls/100 C); as determined via Fourier Transform Infrared (FTIR) spectroscopy according to ASTM D3124-98 and ASTM D6248-98. In an embodiment, the polyethylene used to prepare the sealant skin layer has from 0.04 to 0.06 terminal vinyls/100 C.

Catalyst Residues (Total Catalytic Metal)

The polyethylene used in the sealant skin layer will typically also contain greater than 3 parts per million (ppm) of at least one Group IV transition metal (especially Ti) where the quantity of catalytic metal was determined by Neutron Activation Analysis (N.A.A.) as specified herein. In contrast, most commercially available single site catalyzed polyethylene contains less than 3 ppm of Group IV metal i.e. the polyethylene that is produced using only a single site catalyst typically contains less titanium residue than the "DC" polymers disclosed herein.

Additives and Adjuvants

The ethylene polymers used herein may optionally include, depending on its intended use, additives and adjuvants. Non-limiting examples of additives and adjuvants include, anti-blocking agents, antioxidants, heat stabilizers, slip agents, processing aids, anti-static additives, colorants, dyes, filler materials, light stabilizers, heat stabilizers, light absorbers, lubricants, pigments, plasticizers, nucleating agents and combinations thereof. Non-limiting examples of suitable primary antioxidants include IRGANOX® 1010 [CAS Reg. No. 6683-19-8] and IRGANOX® 1076 [CAS Reg. No. 2082-79-3]; both available from BASF Corporation, Florham Park, N.J., U.S.A. Non-limiting examples of suitable secondary antioxidants include IRGAFOS® 168 [CAS Reg. No. 31570-04-4], available from BASF Corporation, Florham Park, N.J., U.S.A.; Weston 705 [CAS Reg. No. 939402-02-5], available from Addivant, Danbury Conn., U.S.A. and; DOVERPHOS® IGP-11 [CAS Reg. No. 1227937-46-3] available form Dover Chemical Corporation, Dover Ohio, U.S.A.

Testing Methods

Density

Polyethylene densities are determined using ASTM D792-13 (Nov. 1, 2013).

Melt Index

Polyethylene melt index measurements is determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. Melt index is commonly report with units of g/10 minute or dg/minute; these units are equivalent. Herein, the term "stress exponent" or its acronym "S.Ex.", is defined by the following relationship:

$$S.Ex.=\log(I_6/I_2)/\log(6480/2160)$$

wherein $I_6$ and $I_2$ are the melt flow rates measured at 190° C. using 6.48 kg and 2.16 kg loads, respectively. In this disclosure, melt index is expressed using the units of g/10 minute or g/10 min or dg/minute or dg/min; these units are equivalent.

Gel Permeation Chromatography (GPC)

Polyethylene molecular weights, $M_n$, $M_w$ and $M_z$, as well the as the polydispersity ($M_w/M_n$), are determined using ASTM D6474-12 (Dec. 15, 2012). This method illuminates the molecular weight distributions of ethylene polymer products by high temperature gel permeation chromatography (GPC). The method uses commercially available polystyrene standards to calibrate the GPC.

Unsaturation Content

The quantity of unsaturated groups, i.e. double bonds, in a polyethylene product is determined according to ASTM D3124-98 (vinylidene unsaturation, published March 2011) and ASTM D6248-98 (vinyl and trans unsaturation, published July 2012).

Comonomer Content

The quantity of comonomer in polyethylene is determined by FTIR (Fourier Transform Infrared spectroscopy) according to ASTM D6645-01 (published January 2010).

Composition Distribution Branching Index (CDBI)

The "Composition Distribution Branching Index" or "CDBI" is determined using a crystal-TREF unit commercially available form Polymer Char (Valencia, Spain). The acronym "TREF" refers to Temperature Rising Elution Fractionation. A sample of polyethylene (80 to 100 mg) is placed in the reactor of the Polymer Char crystal-TREF unit, the reactor is filled with 35 ml of 1,2,4-trichlorobenzene (TCB), heated to 150° C. and held at this temperature for 2 hours to dissolve the sample.

An aliquot of the TCB solution (1.5 mL) is then loaded into the Polymer Char TREF column filled with stainless steel beads and the column is equilibrated for 45 minutes at 110° C. The polyethylene is then crystallized from the TCB solution, in the TREF column, by slowly cooling the column from 110° C. to 30° C. using a cooling rate of 0.09° C. per minute. The TREF column is then equilibrated at 30° C. for 30 minutes. The crystallized polyethylene is then eluted from the TREF column by passing pure TCB solvent through the column at a flow rate of 0.75 mL/minute as the temperature of the column is slowly increased from 30° C. to 120° C. using a heating rate of 0.25° C. per minute. Using Polymer Char software a TREF distribution curve is generated as the ethylene polymer product is eluted from the TREF column, i.e. a TREF distribution curve is a plot of the quantity (or intensity) of ethylene polymer eluting from the column as a function of TREF elution temperature. A $CDBI_{50}$ is calculated from the TREF distribution curve. The "$CDBI_{50}$" is defined as the percent of ethylene polymer whose composition is within 50% of the median comonomer composition (25% on each side of the median comonomer composition); it is calculated from the TREF composition distribution curve and the normalized cumulative integral of the TREF composition distribution curve. Those skilled in the art will understand that a calibration curve is required to convert a TREF elution temperature to comonomer content, i.e. the amount of comonomer in the ethylene polymer fraction that elutes at a specific temperature. The generation of such calibration curves are described in, e.g. Wild et al., J. Polym. Sci., Part B, Polym. Phys., Vol. 20 (3), pages 441-455: hereby fully incorporated by reference.

Neutron Activation Analysis (NAA)

Neutron Activation Analysis, hereafter NAA, is used to determine catalyst residues in polyethylene and is performed as follows. A radiation vial (composed of ultrapure polyethylene, 7 mL internal volume) is filled with a polyethylene sample and the sample weight is recorded. Using a pneumatic transfer system the sample is placed inside a SLOWPOKE™ nuclear reactor (Atomic Energy of Canada Limited, Ottawa, Ontario, Canada) and irradiated for 30 to 600 seconds for short half-life elements (e.g. Ti, V, Al, Mg, and Cl) or 3 to 5 hours for long half-life elements (e.g. Zr, Hf, Cr, Fe and Ni). The average thermal neutron flux within the reactor is $5\times10^{11}/cm^2/s$. After irradiation, samples are withdrawn from the reactor and aged, allowing the radioactivity to decay; short half-life elements were aged for 300 seconds (or long half-life elements are aged for several days). After aging, the gamma-ray spectrum of the sample is recorded using a germanium semiconductor gamma-ray detector (ORTEC® model GEM55185, Advanced Measurement Technology Inc., Oak Ridge, Tenn., USA) and a multichannel analyzer (ORTEC® model DSPEC Pro®). The amount of each element in the sample was calculated from the gamma-ray spectrum and recorded in parts per million relative to the total weight of the ethylene polymer sample. The N.A.A. system is calibrated with SPECPURE® standards (1000 ppm solutions of the desired element (greater than 99% pure)). One mL of solutions (elements of interest) is pipetted onto a 15 mm×800 mm rectangular paper filter and air dried. The filter paper is then placed in a 1.4 mL polyethylene irradiation vial and analyzed by the N.A.A. system. Standards are used to determine the sensitivity of the N.A.A. procedure (in counts/µg).

Dilution Index ($Y_d$) Measurements

A series of small amplitude frequency sweep tests were run on each sample using an Anton Paar MCR501 Rotational Rheometer equipped with the "TruGap™ Parallel Plate measuring system". A gap of 1.5 mm and a strain amplitude of 10% were used throughout the tests. The frequency sweeps were from 0.05 to 100 rad/s at the intervals of seven points per decade. The test temperatures were 170°, 190°, 210° and 230° C. Master curves at 190° C. were constructed for each sample using the Rheoplus/32 V3.40 software through the Standard TTS (time-temperature superposition) procedure, with both horizontal and vertical shift enabled.

The flow properties of the polyethylene, e.g., the melt strength and melt flow ratio (MFR) are well characterized by the Dilution Index ($Y_d$) and the Dimensionless Modulus ($X_d$) as described in U.S. Pat. No. 9,512,282. In both cases, the flow property is a strong function of $Y_d$ and $X_d$ in addition a dependence on the zero-shear viscosity. For example, the melt strength (hereafter MS) values of the polyethylenes were found to follow the same equation, confirming that the characteristic VGP point (($\sqrt{2})G^*_c/G^*_x$, $\delta_c$) and the derived regrouped coordinates ($X_d$, $Y_d$) represent the structure well:

$$MS = a_{00} + a_{10} \log \eta_0 - a_{20}(90-\delta_c) - a_{30}((\sqrt{2})G^*_c/G^*_x) - a_{40}(90-\delta_c)((\sqrt{2})G^*_c/G^*_x)$$

where $a_{00}=-33.33$; $a_{10}=9.529$; $a_{20}=0.03517$; $a_{30}=0.894$; $a_{40}=0.02969$ and $r^2=0.984$ and the average relative standard deviation was 0.85%. Further, this relation can be expressed in terms of the Dilution Index ($Y_d$) and the Dimensionless Modulus ($X_d$):

$$MS = a_0 + a_1 \log \eta_0 + a_2 Y_d + a_3 X_d + a_4 Y_d X_d$$

where $a_0=33.34$; $a_1=9.794$; $a_2=0.02589$; $a_3=0.1126$; $a_4=0.03307$ and $r^2=0.989$ and the average relative standard deviation was 0.89%.

The MFR of the polyethylenes disclosed in U.S. Pat. No. 9,512,282 were found to follow a similar equation, further confirming that the dilution parameters $Y_d$ and $X_d$ show that the flow properties of the novel polyethylenes of U.S. Pat. No. 9,512,282 differ from the reference and comparative polyethylenes:

$$MFR = b_0 - b_1 \log \eta_0 - b_2 Y_d - b_3 X_d$$

where $b_0=53.27$; $b_1=6.107$; $b_2=1.384$; $b_3=20.34$ and $r^2=0.889$ and the average relative standard deviation and 3.3%.

EXAMPLES

Other test procedures that are useful for measuring film properties are briefly described below.

Gloss is determined by ASTM D2457.

Haze is determined by ASTM D1003.

Tensile properties (% elongation and tensile strength at break) were determined by ASTM D638.

Film rigidity is measured using a test procedure that is in substantial accordance with ASTM D2923 ("Rigidity of Polyolefin Film and Sheeting"). The test instrument has a sample platform that contains a linear slot. The sample of the film that is to be tested is placed on the platform and a blade is then used to force the film into the slot. The width of the slot is 10 mm. The film sample is 4"×4" (10.2 cm by 10.2 cm). The results from the test are plotted on a load (in grams) versus extension (in cm) graph. The peak load that is observed during the test (in grams) is divided by the length of the sample (10.16 cm) to produce a "rigidity" value (reported in grams per cm). The test is conducted in both the machine direction (MD) and traverse direction (TD). Rigidity results may be reported as MD; TD; or the average of MD+TD.

The following materials (polyethylene and EVOH) were used in the examples (Table 1).

TABLE 1

| Material (polyethylene or EVOH) | Melt Index, $I_2$ (g/10 min) | Density (g/cm$^3$) | Comonomer |
|---|---|---|---|
| 1 (DC) | (1) | 0.914 | 1-octene |
| 2 (Z/N) | 1 | 0.958 | none |
| 3-t (Z/N) | 0.8 | 0.934 | 1-hexene |
| 4 EVOH | 1.6 | 1.19 | — |
| 5 | 0.8 | 0.934 | 1-hexene |
| 6 (SSC) | 1.2 | 0.967 | none |
| 7 (DC) | 0.9 | 0.919 | 1-octene |
| 8 (Z/N) | 0.9 | 0.912 | 1-octene |

The term "ZN" in brackets above indicates that the polyethylene was prepared with a Ziegler Natta catalyst system. The term "SSC" indicates that the polyethylene was prepared with a single site catalyst system. The term "DC" indicates that the polyethylene was prepared with a Dual Catalyst system that includes a Z/N catalyst and a SSC catalyst. Polyethylene 1 (DC) in Table 1 has a Dilution Index, Yd, of 3.4°; a dimensionless modulus of −0.05 and contains about 10 ppm residual titanium. Polyethylene 1 was prepared in the manner described in U.S. Pat. No. 9,512,282, i.e. using a dual catalyst system (a single site catalyst having a titanium-phosphinimine/cyclopentadienyl molecule and a heterogeneous Z/N catalyst).

Polyethylene 6 contains 1200 ppm of a nucleating agent sold under the trademark HYPERFORM® 20E by Milliken Chemicals. Polyethylene 3-t is a blend of 80 weight % of Polyethylene 5+20 weight % of a "tie" resin (sold under the tradename BYNEL® 41E710 by DuPont and reported to be a maleic anhydride modified polyethylene).

This blend 3-t serves as a "tie layer" to ensure good adhesion of the polyethylene layers to the ethylene-vinyl-alcohol (EVOH) resin shown as material 4 in Table 1. Polyethylene 1 and Polyethylene 7 were made in substantial accordance with the process in the examples of U.S. Pat. No. 9,512,282. The EVOH shown as material 4 is sold under the tradename EVAL™ F171B by Kurraray Industries of Japan.

Example: Improved SUP Process

Comparative: Several retail stand up pouches containing foods were purchased at a grocery store. These SUPs were prepared with a conventional PET/PE structure. Film rigidity testing was carried out on a number of films obtained from these retail packages. The film samples each had a thickness of about 3.5 mil. Using the blade/slot apparatus described above, the average rigidity was measured at 5.5 g/cm in both the MD and TD directions. MD rigidity is important because it affects the ability of the SUP to be self-supporting (i.e. to "stand"). It is also important to provide this rigidity with minimum film thickness because down gauged/thinner films use less material. This PET/PE structure has a rigidity/thickness ratio of 5.5 g/cm/3.5 mils (i.e. when "normalized" to a thickness of 1 mil, this corresponds to a rigidity of 1.6 g/cm per mil of thickness in the MD).

Comparative 2: A 4 layer coextruded film structure was made using a blown film line. The coextruded structure had an overall thickness of 3.5 mils and had the architecture shown in Table 2.

TABLE 2

Comparative Film 2

| Film Structure Layer | Material Type | Thickness (mils) |
|---|---|---|
| (Skin) 1 | 2 | 0.75 |
| 2 | 5 | 0.8 |
| 3 | 6 | 1.5 |
| (Skin) 4 | 8 | 0.45 |

TABLE 3

Inventive 1 Film

| Layer | Material Type | Amount (weight %) |
|---|---|---|
| (Skin) 1 | 1 | 12.0 |
| 2 | 6 | 14.0 |
| 3 | 6 | 14.0 |
| 4 | 6 | 16.0 |
| 5 | 5 | 7.0 |
| 6 | 5 | 8.0 |
| 7 | 5 | 8.0 |
| 8 | 2 | 10.0 |
| (Skin) 9 | 2 | 11.0 |

The PE types correspond to the descriptions shown in Table 1.

Film rigidity testing was carried out on the structure shown in Table 2 and values of 7.9 g/cm in the MD direction and 6.6 g/cm in the TD were obtained. Thus, the normalized MD rigidity of this coextruded multilayer film structure is 7.9/3.5 or 2.3 g/cm per mil of thickness. This compares very well to the normalized MD rigidity of 1.6 g/cm per mil of thickness that was measured in a PET/PE structure in commercial use in retail packaging.

Inventive Film 1: A nine layer coextruded film structure was made using a blown film line. The coextruded structure had an overall thickness of 3.5 mils and had the composition shown in Table 3. For clarity—skin 1 layer is made from Material 1and is present in an amount of 12 weight %. As shown in Table 1 and accompanying notes, Material 1 is a linear low density polyethylene having a Dilution Index of 3.4 and a density of 0.914 g/cc. This skin layer 1 may also be referred to as the sealant layer or the sealant skin layer. The second skin layer—layer 9 in Table 3—is made from Material 2 and is present in an amount of 11 weight %. Material 2 is a high density polyethylene homopolymer (i.e. no comonomer) having a density of 0.958 g/cc and is made with a Z/N catalyst. The core of inventive film 1 consists of layers 2-8 and is made from Material 6 (a high density ethylene polymer having a density of 0.967 g/cc) and Material 5 (a medium density polyethylene having a density of 0.934 g/cc) in the amounts indicated in Table 3.

"Comparative 2" film structure was used for the preparation of SUP packages on a conventional "SUP machine" that is purpose-designed for the conversion of polymeric roll stock into SUP packages. Prior polymeric roll stock typically consists of a layer of polyester (PET) and a layer of polyethylene (PE).

The PET layer of prior films provides high rigidity. In addition, PET has a higher melting point than PE and PET has good tensile strength. The SUP machine places an elongational load on the roll stock during the process to convert the roll stock to SUP packages. In addition, heat is applied to the roll stock in order to form the seals of the SUP package. Thus, the roll stock needs to resist the elongational forces (because, if the roll stock is stretched, the printing and cutting of the SUP packages will be "off center") and the roll stock needs to form strong seals.

Heat from the sealing bar is applied to the skin layer made from high density polyethylene (because it has a higher melting point, and is more resistant to "burn through" than the low density seal/skin layer). The seal is formed when two adjacent sealant skin layers melt together.

It will be recognized by those skilled in the art that the melting point of linear polyethylene is a function of density/comonomer content and that the melting point generally decreases as density decreases. The density of the sealant layer of comparative 2 reflects this—it has a very low density of 0.912 g/cc.

The roll stock of comparative 2 can be readily converted into SUP packages on conventional SUP machinery. It is possible to prepare high quality SUP packages (with the printing properly "centered" on the packages and with strong seals) at high production rates. In general, the production rate can be limited by mis-formed seals.

We have now observed that it is possible to improve SUP package production efficiency with the use of a polyethylene having a Dilution Index of greater than 0°.

One important difference between comparative 2 and Inventive 1 is that the roll stock of Inventive 1 has a sealant skin layer made from a polyethylene having a Dilution Index of greater than 0. It is also notable that the density of this resin is 0.914 g/cc (whereas the comparative skin layer of comparative 2 has a density of 0.912 g/cc) because lower density polyethylene is generally preferred for the preparation of seals. The roll stock of inventive 1 can also be readily converted onto SUP packages on conventional SUP machinery. The use of this roll stock can allow higher production rates and/o fewer package failures at a given production rate than the use of comparative 2 roll stock. Again, this is surprising because the density of the sealant layer in inventive 1 is actually higher than the density of the sealant layer of comparative 2.

The coextruded (or "coex") films disclosed herein (and demonstrated in examples 2 and 3) were prepared on a conventional blown film line. It will be recognized by those skilled in the art that multilayer films may also be prepared by conventional laminator techniques.

Examples 2 and 3

Multilayer Films with Improved Impact Properties

The film labelled inventive 1 in example 1 has one skin layer prepared from high density polyethylene and the other skin layer (also referred to as the sealant layer) that is prepared from a linear low density polyethylene having a Dilution index of greater than 0°. These films have been found to provide excellent processability on SUP conversion machinery. The core (i.e. interior layers) of inventive 1 were prepared using high and medium density polyethylene. This provides good rigidity (which is desirable for SUP packages) but the impact strength of these packages is not very high.

Examples 2 and 3 illustrate multilayer films having skin layers that use the skin layers of inventive 1 (i.e. one skin layer is a high density polyethylene and the other skin layer is a skin sealant layer made from a linear low density polyethylene having a Dilution Index of greater than 0); however, the core of the multilayer films of these examples is prepared using polymers having a lower density (on an overall/average basis in comparison to inventive 1).

The films of examples 2 and 3 are not optimized for the preparation of SUP packages. In comparison to the use of inventive film 1, these films would be expected to produce a less rigid/more "floppy" SUP package—and—it is probable that these films would not be as "processable" on SUP machinery (which means that these films would be expected to run at lower production rates on SUP machinery).

However, the films of examples 2 and 3 are suitable for other Form Fill Seal (FFS) machines, including Vertical FFS (VFFS) machines. Again, the heat required for forming seals in the FFs packages would be applied to the high density skin layer. The heat will then be transmitted/conducted through the thickness of the film to cause the sealant skin layer to melt and form a seal. As noted, the sealant skin layer of the films of these examples is made with a linear low density polyethylene having a Dilution Index of greater than 0—and we have observed that this type of polyethylene provides strong seals with a high level of caulkability.

The composition of inventive film structure 2 is described in Table 4. The thickness of the film is 4 mils.

This film was also subjected to a thermal embossing operation that left cross hatches (i.e. a plurality of small square shapes) in the film. The film withstood the embossing process without suffering "burn through" (where "burn through" means that the film melted and flowed away, leaving holes in the film).

TABLE 4

Inventive Film Structure 2

| Layer | Material | Amount (weight %) |
|---|---|---|
| (Skin) 1 | 1 | 11.0 |
| 2 | 2 | 9.0 |
| 3 | 2 | 10.0 |
| 4 | 3-t | 14.5 |
| 5 | 4 | 5.0 |
| 6 | 3-t | 14.5 |
| 7 | 5 | 18.0 |
| 8 | 2 | 9.0 |
| (Skin) 9 | 2 | 9.0 |

Fifteen samples of inventive film 2 were measured to determine elongation (%) and tensile strength at break (pounds per square inch, psi) in both the MD and TD direction. The film was determined to have an MD elongation of 642 (standard deviation of 78); and MD tensile at break of 3977 (standard deviation of 366); a TD elongation of 613 (standard deviation of 172) and a tensile at break of 3256 (standard deviation of 278).

Example 3

The composition of inventive film 3 is shown in Table 5. The thickness of the film is 4 mils.

This film was also subjected to a thermal embossing operation without suffering "burn through."

TABLE 5

Inventive Film 3 Structure

| Layer | Material | Amount (weight %) |
|---|---|---|
| (Skin) 1 | 1 | 11.0 |
| 2 | 6 | 6.0 |
| 3 | 6 | 6.0 |
| 4 | 7 | 16.0 |
| 5 | 6 | 5.0 |
| 6 | 7 | 14.5 |

TABLE 5-continued

Inventive Film 3 Structure

| Layer | Material | Amount (weight %) |
|---|---|---|
| 7 | 7 | 18.0 |
| 8 | 7 | 13.5 |
| (Skin) 9 | 2 | 10.0 |

Example 3 Film Properties

The dart impact strength of Inventive film 3 was measured as 2,398 grams. The machine direction (MD) tensile strength was 6335 psi. The traverse direction (TD) tensile strength was 6629 psi. The MD elongation of film 3 was 1052%. The TD elongation was 998%

INDUSTRIAL APPLICABILITY

Multilayer films having improved sealing properties are disclosed. The films are suitable for a wide variety of flexible packaging applications, including the production of Stand Up Pouch packages.

The invention claimed is:
1. A stand up pouch comprising:
a first layer and a second layer of a multilayer film wherein the first layer is heat bonded to the second layer, and the multilayer film comprises:
a first skin layer consisting of from 85 to 100 weight % of a high density polyethylene having a density of from 0.95 to 0.97 g/cc and a melt index, $I_2$, of from 0.5 to 10 g/10 minutes;
a second skin layer consisting of from 85 to 100 weight % of a first linear low density interpolymer having a molecular weight distribution Mw/Mn of from 2.5 to 4.0, a density of from 0.90 to 0.92 g/cc, a melt index, $I_2$, of from 0.3 to 3 g/10 minutes and a Dilution Index, Yd, of greater than 0°; and
a core comprising medium density polyethylene having a density of from 0.930 to 0.95 g/cc;
with the proviso that the stand-up pouch comprises at least 90% by weight polyethylene; and
wherein, the first layer of multilayer film is heat bonded to the second layer of multilayer film such that the second skin layer of the first layer is in contact with the second skin layer of the second layer.

2. The stand up pouch of claim 1, wherein the core medium density polyethylene has a density from about 0.935 g/cc to 0.945 g/cc.

3. The stand up pouch of claim 1, wherein the core contains a layer of EVOH, with the proviso that the weight of the EVOH is from 0.5 to 5 weight % of the total weight of polymeric material in the multilayer film.

4. The stand up pouch of claim 1, wherein the multilayer film has from 3 to 11 layers.

5. The stand up pouch of claim 1, wherein the first linear low density interpolymer is synthesized in a multi reactor polymerization system in the presence of at least one single site catalyst formulation and at least one heterogeneous catalyst formulation.

6. The stand up pouch of claim 1, wherein the second skin layer consists of about 85 to 100 weight % of a first linear low density interpolymer having a molecular weight distribution Mw/Mn of 2.5 to 4.0, and a density of about 0.905 to 0.917 g/cc.

7. A stand up pouch comprising:
a first layer and a second layer of a multilayer film wherein the first layer is heat bonded to the second layer, and the multilayer film comprises:
a first skin layer consisting of from 85 to 100 weight % of a high density polyethylene having a density of from 0.95 to 0.97 g/cc and a melt index, $I_2$, of from 0.5 to 10 g/10 minutes;
a second skin layer consisting of from 85 to 100 weight % of a first linear low density interpolymer having a molecular weight distribution Mw/Mn of from 2.5 to 4.0, a density of from 0.90 to 0.92 g/cc, a melt index, $I_2$, of from 0.3 to 3 g/10 minutes and a Dilution Index, Yd, of greater than 0°; and
a core comprising polyethylene;
with the proviso that the stand-up pouch comprises at least 90% by weight polyethylene; and
wherein, the first layer of multilayer film is heat bonded to the second layer of multilayer film such that the second skin layer of the first layer is in contact with the second skin layer of the second layer.

8. The stand up pouch of claim 7, wherein the core contains a layer of ethylene vinyl alcohol (EVOH), with the proviso that the weight of the EVOH is from 0.5 to 5 weight % of the total weight of polymeric material in the multilayer film.

9. The stand up pouch of claim 1, wherein the multilayer film has from 3 to 11 layers.

10. The stand up pouch of claim 1, wherein the first linear low density interpolymer is synthesized in a multi reactor polymerization system in the presence of at least one single site catalyst formulation and at least one heterogeneous catalyst formulation.

11. The stand up pouch of claim 1, wherein the second skin layer consists of about 85 to 100 weight % of a first linear low density interpolymer having a molecular weight distribution Mw/Mn of 2.5 to 4.0, and a density of about 0.905 to 0.917 g/cc.

12. The stand up pouch of claim 1, wherein the second skin layer has a melt index $I_2$ of about 0.5 to 1.5 g/10 min.

13. The stand up pouch of claim 1, wherein the second skin layer has a melt index $I_2$ of about 1.0 g/10 min.

14. A form-fill-seal pouch comprising:
a first layer and a second layer of a multilayer film wherein the first layer is heat bonded to the second layer, and the multilayer film comprises:
a first skin layer consisting of from 85 to 100 weight % of a high density polyethylene having a density of from 0.95 to 0.97 g/cc and a melt index, $I_2$, of from 0.5 to 10 g/10 minutes;
a second skin layer consisting of from 85 to 100 weight % of a first linear low density interpolymer having a molecular weight distribution Mw/Mn of from 2.5 to 4.0, a density of from 0.90 to 0.92 g/cc, a melt index, $I_2$, of from 0.3 to 3 g/10 minutes and a Dilution Index, Yd, of greater than 0°; and
a core comprising linear low density polyethylene having a density of from 0.90 to 0.92 g/cc;
with the proviso that the stand-up pouch comprises at least 90% by weight polyethylene; and
wherein, the first layer of multilayer film is heat bonded to the second layer of multilayer film such that the second skin layer of the first layer is in contact with the second skin layer of the second layer.

15. The form-fill-seal pouch of claim 14, wherein the second skin layer has a density of 905 to 0.917 g/cc.

16. The form-fill-seal pouch of claim 14, wherein the multilayer film has from 3 to 11 layers.

17. The form-fill-seal pouch of claim 14, wherein the first linear low density interpolymer is synthesized in a multi reactor polymerization system in the presence of at least one single site catalyst formulation and at least one heterogeneous catalyst formulation.

\* \* \* \* \*